US010844264B2

(12) United States Patent
Ng et al.

(10) Patent No.: US 10,844,264 B2
(45) Date of Patent: Nov. 24, 2020

(54) LUBRICANT COMPOSITIONS COMPRISING DIOL FUNCTIONAL GROUPS AND METHODS OF MAKING AND USING SAME

(71) Applicant: ExxonMobil Chemical Patents Inc., Baytown, TX (US)

(72) Inventors: Man Kit Ng, Basking Ridge, NJ (US); Tabassumul Haque, Deptford, NJ (US); Joseph R. Pellettiere, Hillside, NJ (US); Hong Cheng, Bridgewater, NJ (US); Dennis G. Peiffer, Annandale, NJ (US); Juan D. Henao, Houston, TX (US); Larry L. Iaccino, Seabrook, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/171,814

(22) Filed: Jun. 2, 2016

(65) Prior Publication Data

US 2017/0002250 A1 Jan. 5, 2017

Related U.S. Application Data

(60) Provisional application No. 62/186,526, filed on Jun. 30, 2015.

(51) Int. Cl.
*C09K 8/035* (2006.01)
*E21B 7/00* (2006.01)
*C09K 8/34* (2006.01)
*C09K 8/32* (2006.01)

(52) U.S. Cl.
CPC .............. *C09K 8/035* (2013.01); *C09K 8/32* (2013.01); *C09K 2208/34* (2013.01)

(58) Field of Classification Search
None
See application file for complete search history.

(56) References Cited

U.S. PATENT DOCUMENTS

| | | | |
|---|---|---|---|
| 2,161,615 A | 6/1939 | Dietrich | |
| 2,764,546 A | 9/1956 | Engle | |
| 3,547,820 A | 12/1970 | Woodward et al. | |
| 3,649,538 A | 3/1972 | Hotten et al. | |
| 3,709,819 A | 1/1973 | Browning | |
| 3,933,658 A | 1/1976 | Beiswanger et al. | |
| 3,979,304 A | 9/1976 | Fischer et al. | |
| 4,108,779 A | 8/1978 | Carney | |
| 4,175,047 A | 11/1979 | Schick et al. | |
| 4,233,162 A | 11/1980 | Carney et al. | |
| 4,280,915 A | 7/1981 | Kercheville | |
| 4,312,767 A | 1/1982 | Adams et al. | |
| 4,323,530 A * | 4/1982 | Voss | B30B 15/0011 264/109 |
| 4,374,737 A | 2/1983 | Larson et al. | |
| 4,384,967 A | 5/1983 | Salentine et al. | |
| 4,406,803 A | 9/1983 | Liston et al. | |
| 4,481,324 A * | 11/1984 | Hall | C08K 5/103 264/211 |
| 4,486,323 A | 12/1984 | Horodysky et al. | |
| 4,615,813 A | 10/1986 | Bretz | |
| 4,634,543 A | 1/1987 | Okada et al. | |
| 4,752,416 A | 6/1988 | Scharf et al. | |
| 4,781,848 A | 11/1988 | Biresaw et al. | |
| 4,803,002 A | 2/1989 | Wollenberg | |
| 4,861,551 A | 3/1989 | Oehler et al. | |
| 4,965,002 A | 10/1990 | Brannen et al. | |
| 5,547,925 A | 8/1996 | Duncan, Jr. | |
| 5,559,085 A | 9/1996 | Duncan, Jr. | |
| 5,587,354 A | 12/1996 | Duncan, Jr. | |
| 5,593,953 A | 1/1997 | Malchow et al. | |
| 5,639,715 A | 6/1997 | Patel | |
| 5,710,110 A | 1/1998 | Cooperman et al. | |
| 5,792,733 A | 8/1998 | Minami et al. | |
| 5,807,811 A * | 9/1998 | Malchow, Jr. | B01F 17/0021 507/128 |
| 5,863,302 A | 1/1999 | Carey et al. | |
| 5,990,050 A * | 11/1999 | Patel | C09K 8/32 507/136 |
| 6,232,275 B1 | 5/2001 | Ichihashi et al. | |
| 6,489,272 B2 | 12/2002 | Gatlin | |
| 6,511,946 B1 | 1/2003 | Theis et al. | |
| 6,695,012 B1 * | 2/2004 | Ring | B21D 39/04 138/137 |
| 6,989,354 B2 | 1/2006 | Thaemlitz et al. | |
| 7,055,628 B2 | 6/2006 | Grainger et al. | |

(Continued)

FOREIGN PATENT DOCUMENTS

| | | |
|---|---|---|
| CA | 2576138 | 5/2003 |
| CN | 1660958 | 8/2005 |

(Continued)

OTHER PUBLICATIONS

Rudnick, L.R., Lubricant Additives: Chemistry and Applications, $2^{nd}$ ed., CRC Press, 2009, Ch. 8, pp. 220-224.
Soares, Vera L.P. et al., "New Applications for Soybean Biodiesel Glycerol," InTech, 2011, Soybean—Applicationsand Technology, pp. 151-172.
Suresh, K. et al., Synthesis, Structure, and Properties of Novel Polyols from Cardanol and Developed Polyurethanes, Industrial & Engineering Chemistry Research, vol. 44, No. 13, pp. 4504-4512, 2005.
Ionscu M., et al., "Polyols and Rigid Polyurethane Foams from Cashew Nut Shell Liquid," J. Poly. Environ., Bol. 20, pp. 647-658, 2012.
Voirin, C., et al., "Functionalization of Cardanol: Towards Biobased Polymers and Additives", Polymer Chemistry, Bol. 5, pp. 3412-3161, 2014.

(Continued)

*Primary Examiner* — John J Figueroa

(57) ABSTRACT

Lubricant compositions having at least one base oil composition including about 1.0 to about 15.0 wt % water, and a friction-reducing composition including a glycerol or thioglycerol compositions are described. Methods for making such lubricant compositions and methods of drilling using such lubricant compositions are also described.

11 Claims, No Drawings

(56) References Cited

U.S. PATENT DOCUMENTS

| | | |
|---|---|---|
| 7,094,738 B2 | 8/2006 | Patel et al. |
| 7,343,986 B2 | 3/2008 | Dixon |
| 7,560,418 B2 | 7/2009 | Bell et al. |
| 7,928,182 B2 | 4/2011 | Dinh et al. |
| 7,989,408 B2 | 8/2011 | Poirier et al. |
| 8,084,401 B2 | 12/2011 | Lukocs et al. |
| 8,252,729 B2 | 8/2012 | Zhang |
| 8,299,005 B2 | 10/2012 | Poirier et al. |
| 9,474,916 B2 | 10/2016 | Gu et al. |
| 9,518,212 B2 | 12/2016 | Delgado et al. |
| 9,637,673 B2 | 5/2017 | McDaniel |
| 2004/0110659 A1 | 6/2004 | Herault et al. |
| 2005/0037930 A1 | 2/2005 | Horton |
| 2005/0123639 A1* | 6/2005 | Ring .................... B21D 39/04 425/392 |
| 2005/0239665 A1 | 10/2005 | Schmidt |
| 2007/0087944 A1 | 4/2007 | Phillips |
| 2004/0014609 A1 | 7/2007 | Dalmazzone et al. |
| 2007/0197402 A1 | 8/2007 | O'Neil et al. |
| 2007/0232504 A1 | 10/2007 | Goyal et al. |
| 2007/0287640 A1 | 12/2007 | Ballard |
| 2007/0298976 A1 | 12/2007 | Ballard |
| 2009/0005271 A1 | 1/2009 | Massam et al. |
| 2009/0054271 A1 | 2/2009 | Dinh et al. |
| 2009/0192052 A1* | 7/2009 | Zhang .................... C09K 8/032 507/140 |
| 2009/0209940 A1 | 8/2009 | Nimkar et al. |
| 2010/0021636 A1* | 1/2010 | Jacke .................... C08K 5/10 427/256 |
| 2010/0160198 A1 | 6/2010 | Ruhe, Jr. |
| 2011/0021394 A1 | 1/2011 | Nakao et al. |
| 2012/0202726 A1 | 8/2012 | William et al. |
| 2014/0051617 A1 | 2/2014 | Wilkes |
| 2014/0121135 A1 | 5/2014 | Gamage et al. |
| 2014/0162919 A1 | 6/2014 | Fu et al. |
| 2014/0179572 A1* | 6/2014 | Loper .................... C10M 133/16 508/287 |
| 2014/0179579 A1 | 6/2014 | Styer et al. |
| 2014/0187457 A1 | 7/2014 | Kanga et al. |
| 2014/0231145 A1 | 8/2014 | Kverel et al. |
| 2014/0284059 A1 | 9/2014 | Mesher et al. |
| 2014/0360451 A1 | 11/2014 | Dodd |
| 2014/0364345 A1 | 12/2014 | Sundaram et al. |
| 2014/0371120 A1 | 12/2014 | Marsh et al. |
| 2015/0024986 A1 | 1/2015 | Loper |
| 2015/0036962 A1 | 2/2015 | Ogahara et al. |
| 2015/0065398 A1* | 3/2015 | Gartland .................... C09K 8/36 507/118 |
| 2015/0087567 A1 | 3/2015 | Ushioda et al. |
| 2015/0376537 A1 | 12/2015 | DeBlase et al. |
| 2016/0251591 A1 | 9/2016 | DeBlase et al. |
| 2017/0002250 A1 | 1/2017 | Ng et al. |
| 2017/0002251 A1 | 1/2017 | Haque et al. |
| 2017/0002252 A1 | 1/2017 | Ng et al. |
| 2017/0002253 A1 | 1/2017 | Haque et al. |
| 2017/0002254 A1 | 1/2017 | Haque et al. |
| 2017/0107417 A1 | 4/2017 | Iaccino et al. |
| 2015/0014062 A1 | 1/2018 | Napierala et al. |

FOREIGN PATENT DOCUMENTS

| | | |
|---|---|---|
| CN | 103897678 | 7/2014 |
| CN | 103965841 | 8/2014 |
| EP | 0 120 665 | 5/1987 |
| EP | 2447346 | 5/2012 |
| GB | 629 139 | 9/1949 |
| GB | 2 251 447 | 7/1992 |
| JP | H07-150170 | 6/1995 |
| JP | 2002-206094 | 7/2002 |
| JP | 2007-153946 | 6/2007 |
| RU | 2119938 | 10/1998 |
| SU | 840087 | 6/1981 |
| WO | WO1994-02565 | 2/1994 |
| WO | WO1994/14932 | 7/1994 |
| WO | WO1997-10313 | 3/1997 |
| WO | WO2003-031534 | 4/2003 |
| WO | 2007/143749 A1 | 12/2007 |
| WO | 2008/062454 A2 | 5/2008 |
| WO | 2008/137706 A | 11/2008 |
| WO | WO2009/102346 | 8/2009 |
| WO | WO2010/080308 | 7/2010 |
| WO | WO2010/115864 | 10/2010 |
| WO | WO2015/016874 | 2/2015 |
| WO | 2017/176244 A1 | 10/2017 |

OTHER PUBLICATIONS

Gupta, R.K. et al. "Preparation and Characterization of Electrically Conducting Langmuir-Blodgett Films of Poly(N-octadecylaniline)," Journal of Colloid and Interface Science, vol. 285, pp. 67-73, 2005.

Ito, A. et al., "n-Alkyl Group-Substituted Poly(m-aniline)s: Synthesis and Magnetic Proprties," Macromolecules, Bo. 28, pp. 5618-5626, 1995.

Integrity Industries, Inc. Ultra Lube II, p.1, Apr. 21, 2016 www.integrityindustries.com/ultra-lube-ii.html.

Hereland et al., International Journal of Eng & Sci. (IJES) 2013,2,9-16.

* cited by examiner

LUBRICANT COMPOSITIONS COMPRISING DIOL FUNCTIONAL GROUPS AND METHODS OF MAKING AND USING SAME

PRIORITY

This invention claims priority to and the benefit of U.S. Ser. No. 62/186,526 filed Jun. 30, 2015, which is incorporated by reference herein.

This invention relates to U.S. Ser. No. 62/186,503, filed Jun. 30, 2015, entitled "Glycerol Carbamate Based Lubricant Compositions and Methods of Making and Using Same"; U.S. Ser. No. 62/186,494, filed Jun. 30, 2015, entitled "Lubricant Compositions and Methods of Making and Using Same"; U.S. Ser. No. 62/186,509, filed Jun. 30, 2015, entitled "Lubricant Compositions and Methods of Making and Using Same"; and U.S. Ser. No. 62/186,516, filed Jun. 30, 2015, entitled "Lubricant Compositions Containing Phosphates and/or Phosphites and Methods of Making and Using Same".

FIELD OF THE INVENTION

The present disclosure relates to lubricant compositions and drilling fluid compositions useful in drilling operations.

BACKGROUND OF THE INVENTION

The process of drilling a hole in the ground for the extraction of a natural resource requires a fluid for removing the cuttings from the wellbore, lubricating and cooling the drill bit, controlling formation pressures and maintaining hole stability.

Many formations present difficulties for drilling. For example, the horizontal displacement that occurs in extended reach drilling (ERD) is often limited by torque and drag losses due to friction. Surface interactions, such as rotation of the drill string, is believed to contribute to such frictional losses. In extended reach drilling frictional losses can be reduced by using a hydrocarbon-based drilling fluid. Additives can be added to the hydrocarbon-based fluid to further reduce the frictional losses.

Nevertheless, extended reach drilling could be more useful if longer wellbores could be effectively drilled. Thus, there is need in the art for new lubricant compositions, e.g., for use in drilling operations, particularly extended reach drilling.

SUMMARY OF THE INVENTION

The subject matter of this application relates, in part, to the discovery that certain glycerol and thioglycerol compositions, when added to a base oil composition that includes water, can significantly reduce the coefficient of friction experienced during drilling. It is believed that such reductions in the coefficient of friction can lead to improved drilling operations, particularly to drill longer wellbores.

Thus, in an aspect, embodiments described herein relate to lubricant compositions, particularly lubricant compositions suitable for use in drilling operations. Such lubricant compositions comprise:
a) about 90.0 to 99.0 wt % of at least one base oil composition, the base oil composition comprising about 1.0 to about 15.0 wt % water, and
b) from about 1.0 to about 10.0 wt % of a friction-reducing composition comprising: at least one compound represented by Formula I:

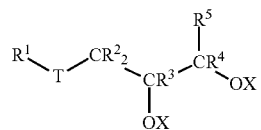

Formula I wherein each $R^1$ to $R^5$ is independently selected from the group consisting of H and branched or unbranched, substituted or unsubstituted, $C_1$ to $C_{50}$ hydrocarbyl groups;

T is selected from the group consisting of O, S, and C(O)O groups; and

X is selected from H, branched or unbranched, substituted or unsubstituted $C_1$ to $C_{50}$ hydrocarbyl groups, acyl groups having a formula of R*C(O)— wherein R* may be a branched or unbranched, substituted or unsubstituted $C_1$ to $C_{50}$ hydrocarbyl group, an ester group having a formula of R"C(O)O—, where R" may be a branched or unbranched, substituted or unsubstituted $C_1$ to $C_{50}$ hydrocarbyl group, Group 1-2 metals, $NR_4^+$ and $PR_4^+$ groups, where each R group is independently selected from H and hydrocarbyl groups.

In another aspect, embodiments of the invention relate to methods of making a lubricant composition, particularly a lubricant composition suitable for use in drilling operations. Such methods comprise:
a) providing at least one base oil composition, the base oil composition comprising about 1.0 to about 15.0 wt % water, and
b) combining about 90.0 to about 99.0 wt % of the base oil composition with about 1.0 to about 10.0 wt % of a friction-reducing composition comprising: a compound represented by Formula I:

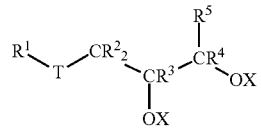

Formula I wherein each $R^1$ to $R^5$ is independently selected from the group consisting of H and branched or unbranched, substituted or unsubstituted, $C_1$ to $C_{50}$ hydrocarbyl groups;

T is selected from the group consisting of O, S, and C(O)O groups; and

X is selected from H, branched or unbranched, substituted or unsubstituted $C_1$ to $C_{50}$ hydrocarbyl groups, acyl groups having a formula of R*C(O)— wherein R* may be a branched or unbranched, substituted or unsubstituted $C_1$ to $C_{50}$ hydrocarbyl group, an ester group having a formula of R"C(O)O—, where R" may be a branched or unbranched, substituted or unsubstituted $C_1$ to $C_{50}$ hydrocarbyl group, Group 1-2 metals, $NR_4^+$ and $PR_4^+$ groups, where each R group is independently selected from H and hydrocarbyl groups.

In still another aspect, embodiments of the invention relate to methods of drilling a wellbore. In one embodiment, such a method comprises:
a) providing at least one base oil composition to the wellbore, the base oil composition comprising about 1.0 to about 15.0 wt % water, and
b) providing a friction-reducing composition to the wellbore to achieve a concentration of the friction-reducing agent of about 1.0 to about 10.0 wt %, based on the weight of the base oil composition and the friction-reducing composition, the friction-reducing composition comprising: a compound represented by Formula I, as described above.

In still other aspects, embodiments relate to methods of providing a lubricant composition to a drilling operation. In one embodiment, the method comprises:

a) providing to said drilling operation at least one base oil composition, the base oil composition comprising about 1.0 to about 15.0 wt % water, b) operating said drilling operation for a period of time with said base oil composition, and c) adding to the drilling operation a friction-reducing composition comprising: a compound represented by Formula I as described above.

Still other embodiments relate to methods of preparing a wellbore comprising providing a lubricant composition described herein to the wellbore and to methods of producing hydrocarbons comprising providing a lubricant composition described herein a wellbore.

DETAILED DESCRIPTION OF THE INVENTION

As used herein, the terms "well" and "wellbore" are used interchangeably and can include, without limitation, an oil, gas or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within about 10 feet of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing or drill string may be placed into the wellbore. The tubing or drill string allows fluids to be circulated in the wellbore. In a cased-hole wellbore portion, a casing is placed and cemented into the wellbore which can also contain a tubing or drill string. The space between two cylindrical shapes is called an annulus. Examples of an annulus include, but are not limited to, the space between the wellbore and the outside of a tubing or drill string in an open-hole wellbore; the space between the wellbore and the outside of a casing in a cased-hole wellbore; and the space between the inside of a casing and the outside of a tubing or drill string in a cased-hole wellbore.

For the purpose of this invention, friction means the mechanical resistance and rubbing of the drill string with the cased hole and the open hole as the drill string or tubing is moved, withdrawn, advanced or rotated. Furthermore, it also comprises the mechanical resistance of coiled tubing inside the cased and the open hole; introducing casing; introducing screens; introducing tools for cleaning, fracturing, and perforating; rotating drill string; advancing the wellbore; withdrawing a drill string; and/or withdrawing coiled tubing.

For the purposes of this invention and the claims thereto, the new numbering scheme for the Periodic Table Groups is used as described in Chemical and Engineering News, (1985), Vol. 63(5), pg. 27.

The person of ordinary skill in the art will recognize that the alcohol groups on the diols described herein are subject to deprotonation. Thus, the term "glycerol" as used herein includes salts of the diol formed by the reaction thereof with a suitable counterion. Some suitable counterions include, but are not limited to, Group 1-2 metals, organic cations, e.g. $NR_4^+$ and $PR_4^+$ groups, where each R group is independently selected from H and hydrocarbyl groups; etc.

In any embodiment described herein, Group 1-2 metals includes Li, Na, K, Rb, Cs, Fr, Be, Mg, Ca, Sr, Ba, Ra, preferably Li, Na, K, Cs, Mg and Ca.

The terms "hydrocarbyl radical," "hydrocarbyl," "hydrocarbyl group," "alkyl radical," and "alkyl" are used interchangeably throughout this document. Likewise, the terms "group", "radical", and "substituent" are also used interchangeably in this document. For purposes of this disclosure, "hydrocarbyl radical" is defined to be $C_1$-$C_{50}$ radicals, that may be linear, branched, or cyclic, and when cyclic, aromatic or non-aromatic. Examples of such radicals include, but are not limited to, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted hydrocarbyl radicals are radicals in which at least one hydrogen atom of the hydrocarbyl radical has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like, or where at least one heteroatom has been inserted within a hydrocarbyl ring.

The term "alkenyl" means a straight-chain, branched-chain, or cyclic hydrocarbon radical having one or more double bonds. These alkenyl radicals may be optionally substituted. Examples of suitable alkenyl radicals include, but are not limited to, ethenyl, propenyl, allyl, 1,4-butadienyl cyclopropenyl, cyclobutenyl, cyclopentenyl, cyclohexenyl, cyclooctenyl, and the like including their substituted analogues.

The term "alkoxy" or "alkoxide" means an alkyl ether or aryl ether radical wherein the term alkyl is as defined above. Examples of suitable alkyl ether radicals include, but are not limited to, methoxy, ethoxy, n-propoxy, iso-propoxy, n-butoxy, iso-butoxy, sec-butoxy, tert-butoxy, phenoxy, and the like.

The term "aryl" or "aryl group" means a six carbon aromatic ring and the substituted variants thereof, including but not limited to, phenyl, 2-methyl-phenyl, xylyl, 4-bromoxylyl. Likewise heteroaryl means an aryl group where a ring carbon atom (or two or three ring carbon atoms) has been replaced with a heteroatom, preferably N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise, the term aromatic also refers to substituted aromatics.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

As used herein, the term "heterogeneous blend" means a composition having two or more morphological phases in the same state. For example, a blend of immiscible components, e.g., oil and water, where one component forms discrete packets dispersed in a matrix of another component is said to be heterogeneous. By continuous phase is meant the matrix phase in a heterogeneous blend. By discontinuous phase is meant the dispersed phase in a heterogeneous blend.

Kinematic viscosity (also referred to as viscosity) is determined by ASTM D445, and is typically measured at 40° C. (Kv40) or 100° C. (Kv100). If temperature is not indicated, the viscosity is Kv100.

Lubricant Composition

Lubricant compositions that are the subject of this disclosure typically comprise a base oil composition and a friction-reducing agent. The base oil composition is typically present in the lubricant composition in an amount of ≥about 50.0 wt %, ≥about 55.0 wt %, ≥about 60.0 wt %, ≥about 65.0 wt %, ≥about 70.0 wt %, ≥about 75.0 wt %, ≥about 80.0 wt %, ≥about 85.0 wt %, ≥about 90.0 wt %, ≥about 95.0 wt %, or ≥about 97.0 wt %, of the lubricant composition. Additionally or alternatively, the lubricant composition comprises ≤about 99.0 wt %, e.g., ≤about 97.0 wt %, ≤about 95.0 wt %, ≤about 90.0 wt %, ≤about 80.0 wt %, ≤about 75.0 wt %, ≤about 70.0 wt %, ≤about 65.0 wt %, ≤about 60.0 wt %, ≤or about 55.0 wt %, base oil composition. Ranges of the amount of base oil composition in the lubricant composition include ranges formed from any combination of the above-enumerated values, e.g., about 50.0 to about 99.0 wt %, about 55.0 to about 97.0 wt %, about 60.0 to about 95.0 wt %, about 65.0 to about 90.0 wt %, about 70.0 to about 85.0 wt %, about 75.0 to about 80.0 wt %, about 70.0 to about 95.0 wt %, about 85.0 to about 95.0 wt %, etc.

In a preferred embodiment of the invention, the base oil composition comprises a base oil that is present in the lubricant composition in ranges from about 50.0 to about 99.0 wt %, about 55.0 to about 97.0 wt %, about 60.0 to about 95.0 wt %, about 65.0 to about 90.0 wt %, about 70.0 to about 85.0 wt %, about 75.0 to about 80.0 wt %, about 70.0 to about 95.0 wt %, about 85.0 to about 95.0 wt %, and the friction-reducing composition is typically present in the lubricant composition in the amount of about 0.5 to about 10.0 wt %, about 1.0 to about 9.0 wt %, about 1.5 to about 8.0 wt %, about 2.0 to about 7.0 wt %, about 2.5 to about 6.0 wt %, about 3.0 to about 5.0 wt %, about 3.5 to about 4.5 wt %, about 1.0 to about 5.0 wt %, about 2.0 to about 4.0 wt %.

The friction-reducing composition is typically present in the lubricant composition in an amount of ≥about 0.5 wt %, e.g., ≥about 1.0 wt %, ≥about 1.5 wt %, ≥about 2.0 wt %, ≥about 2.5 wt %, ≥about 3.0 wt %, ≥about 3.5 wt %, ≥about 4.0 wt %, ≥about 4.5 wt %, ≥about 5.0 wt %, ≥about 6.0 wt %, ≥about 7.0 wt %, ≥about 8.0 wt %, or ≥about 9.0 wt %. Additionally or alternatively, the lubricant composition comprises ≤about 10.0 wt % e.g., ≤about 9.0 wt %, ≤about 8.0 wt %, ≤about 7.0 wt %, ≤about 6.0 wt %, ≤about 5.0 wt %, ≤about 4.5 wt %, ≤about 4.0 wt %, ≤about 3.5 wt %, ≤about 3.0 wt %, ≤about 2.5 wt %, ≤about 2.0 wt %, ≤about 1.5 wt %, or ≤about 1.0 wt %, friction-reducing agent. Ranges of the amount of friction-reducing composition in the lubricant composition include ranges formed from any combination of the above-enumerated values, e.g., about 0.5 to about 10.0 wt %, about 1.0 to about 9.0 wt %, about 1.5 to about 8.0 wt %, about 2.0 to about 7.0 wt %, about 2.5 to about 6.0 wt %, about 3.0 to about 5.0 wt %, about 3.5 to about 4.5 wt %, about 2.0 to about 4.0 wt %, about 0.1 wt % to about 6.0 wt %, etc.

All weight percentages are based on the total weight of the base oil and the friction-reducing compositions.

Lubricant compositions generally have a coefficient of friction less than that of the base oil composition. Some lubricant compositions have a coefficient of friction of ≤about 0.12, e.g., ≤about 0.10, ≤about 0.08, ≤about 0.06, ≤about 0.04, or ≤about 0.02. Additionally or alternatively, the coefficient of friction may be ≥about 0.01, e.g., ≥about 0.03, ≥about 0.05, ≥about 0.07, ≥about 0.09, or ≥about 0.11. Ranges of the coefficient of friction of the lubricant composition include ranges formed from any combination of the above-enumerated values, e.g., about 0.01 to about 0.12, about 0.3 to about 0.10, about 0.05 to about 0.08, about 0.06 to about 0.07, about 0.08 to about 0.12, about 0.08 to about 0.10, etc.

Additionally or alternatively, the lubricant composition may be characterized by a change in the coefficient of friction relative to the coefficient of friction of the base oil composition without the friction-reducing agent. In other words, the lubricant composition having the friction-reducing agent may have a coefficient of friction that is at least about 20.0% lower than, (alternately, is at least about 25.0% lower than, is at least about 30.0% lower than, is at least about 35.0% lower than, is at least about 40.0% lower than, is at least about 45.0% lower than, is at least about 50.0% lower than, is at least about 55.0% lower than, is at least about 60.0% lower than), the coefficient of friction of the base oil composition in the absence of the additive composition. Ranges of the reduction in the coefficient of friction of the lubricant composition relative to the base oil composition without the friction-reducing composition include ranges formed from any combination of the above-enumerated values, e.g., about 20.0 to about 60.0% lower, about 25.0 to about 55.0% lower, about 30.0 to about 50.0% lower, about 35.0 to about 45.0% lower, about 40.0% lower, about 30.0 to about 60.0% lower, about 35.0 to about 60.0% lower, about 40.0 to about 60.0% lower, about 45.0 to about 60.0% lower, about 40.0 to about 55.0% lower, etc. For clarity, an exemplary lubricant composition may comprise 4.0 g of friction reducing agent and 96.0 g of base oil composition comprising 86.0 g of base oil and 10.0 g of other additives. The reduction in the coefficient of friction would be determined by comparing the coefficient of friction of this exemplary composition would be compared to the coefficient of friction of a composition comprising 86.0 g base oil and 10.0 g of the other additives.

Base Oil Composition

Generally the base oil composition may include a base oil and one or more base oil additives. Numerous base oils are known in the art. Particular base oils that are useful in the present disclosure include both natural oils and synthetic oils, as well as unconventional oils (or mixtures thereof), which can be used unrefined, refined, or re-refined (the latter is also known as reclaimed or reprocessed oil). Unrefined oils are those obtained directly from a natural or synthetic source and used without added purification. These include shale oil obtained directly from retorting operations, petroleum oil obtained directly from primary distillation, and ester oil obtained directly from an esterification process. Refined oils are similar to the oils discussed for unrefined oils except refined oils are subjected to one or more purification steps to improve at least one base oil property. One skilled in the art is familiar with many purification processes. These processes include solvent extraction, secondary distillation, acid extraction, base extraction, filtration, and percolation. Re-refined oils are obtained by processes analogous to refined oils but using an oil that has been previously used as a feed stock.

Groups I, II, III, IV and V are broad lube base oil stock categories developed and defined by the American Petroleum Institute (API Publication 1509; www.API.org) to create guidelines for base oils. Group I base stocks have a viscosity index of 80 to 120 and contain >0.03% sulfur and/or less than 90% saturates. Group II base stocks have a viscosity index of 80 to 120 and contain ≤0.03% sulfur and ≥90% saturates. Group III stocks have a viscosity index≥120 and contain ≤0.03% sulfur and ≥90% saturates. Group IV includes polyalphaolefins (PAO) and Gas-to-Liquid (GTL) materials. Group V base stock includes base stocks not included in Groups I-IV. The table below summarizes properties of each of these five groups.

| Exemplary Base Oil Properties | | | |
|---|---|---|---|
| | Saturates (wt %) | Sulfur (wt %) | Viscosity Index (cSt) |
| Group I | <90 and/or | >0.03 and/or | 80 to 120 |
| Group II | ≥90 and | ≤0.03 and | 80 to 120 |
| Group III | ≥90 and | ≤0.03 and | ≥120 |
| Group IV | Includes PAO's and GTL's | | |
| Group V | All other base oil stocks not included in Groups I-IV | | |

Useful GTL's include those described as high purity hydrocarbon feedstocks at paragraphs [0245]-[0303] of US 2008/0045638. PAO's useful herein include those described in paragraphs [0243]-[0266] of US 2008/0045638. Useful Group III Base Oils include those described at paragraphs [0304]-[0306] of US 2008/0045638.

Natural oils include animal oils, vegetable oils (castor oil and lard oil, for example), and mineral oils. Animal and vegetable oils possessing favorable thermal oxidative stability can be used. Of the natural oils, mineral oils are preferred. Mineral oils vary widely as to their crude source, for example, as to whether they are paraffinic, naphthenic, or mixed paraffinic-naphthenic. Oils derived from coal or shale are also useful. Natural oils vary also as to the method used for their production and purification, for example, their distillation range and whether they are straight run or cracked, hydrorefined, or solvent extracted.

Group II and/or Group III hydroprocessed or hydrocracked basestocks, including synthetic oils, are also well known basestock oils.

Synthetic oils include hydrocarbon oil. Hydrocarbon oils include oils such as polymerized and interpolymerized olefins (polybutylenes, polypropylenes, propylene isobutylene copolymers, ethylene-olefin copolymers, and ethylene-alphaolefin copolymers, for example). Polyalphaolefin (PAO) oil base stocks are commonly used synthetic hydrocarbon oil. By way of example, PAOs derived from $C_8$ to $C_{14}$ olefins, e.g., $C_8$, $C_{10}$, $C_{12}$, $C_{14}$ olefins or mixtures thereof may be utilized. Some such PAO's are described in U.S. Pat. Nos. 4,956,122; 4,827,064; and 4,827,073, each of which is incorporated herein by reference in its entirety.

The number average molecular weights of the PAOs, which are known materials and generally available on a major commercial scale from suppliers such as ExxonMobil Chemical Company, Chevron Phillips Chemical Company, BP, and others, typically vary from 250 to 3,000 g/mol, although PAO's may be made in Kinematic viscosities up to 3500 cSt (100° C.). The PAOs are typically comprised of relatively low molecular weight hydrogenated polymers or oligomers of alphaolefins which include, but are not limited to, $C_2$ to $C_{32}$ alphaolefins with the $C_8$ to $C_{16}$ alphaolefins, such as 1-octene, 1-decene, 1-dodecene and the like, being preferred. The preferred polyalphaolefins are poly-1-octene, poly-1-decene and poly-1-dodecene and mixtures thereof and mixed olefin-derived polyolefins. However, the dimers of higher olefins in the range of $C_{14}$ to $C_{18}$ may be used to provide low viscosity basestocks of acceptably low volatility. Depending on the viscosity grade and the starting oligomer, the PAOs may be predominantly trimers and/or tetramers of the starting olefins, with minor amounts of the higher oligomers, having a viscosity range of 1.5 to 3500 cSt (Kv100), such as from 1.5 to 12 cSt.

The PAO fluids may be conveniently made by the polymerization of an alphaolefin in the presence of a polymerization catalyst such as the Friedel-Crafts catalysts including, for example, aluminum trichloride, boron trifluoride or complexes of boron trifluoride with water, alcohols such as ethanol, propanol or butanol, carboxylic acids or esters such as ethyl acetate or ethyl propionate. For example, the methods disclosed by U.S. Pat. Nos. 4,149,178 or 3,382,291 may be conveniently used herein. Other descriptions of PAO synthesis are found in the following U.S. Pat. Nos. 3,742, 082; 3,769,363; 3,876,720; 4,239,930; 4,367,352; 4,413, 156; 4,434,408; 4,910,355; 4,956,122; and 5,068,487. The dimers of the $C_{14}$ to $C_{18}$ olefins are described in U.S. Pat. No. 4,218,330. The PAO's may be produced using a metallocene catalyst compound as described in U.S. Pat. Nos. 8,535,514 and 8,247,358.

The hydrocarbyl aromatics can be used as base oil or base oil component and can be any hydrocarbyl molecule that contains at least 5% of its weight derived from an aromatic moiety such as a benzenoid moiety or naphthenoid moiety, or their derivatives. These hydrocarbyl aromatics include alkyl benzenes, alkyl naphthalenes, alkyl diphenyl oxides, alkyl naphthols, alkyl diphenyl sulfides, alkylated bis-phenol A, alkylated thiodiphenol, and the like. The aromatic can be mono-alkylated, dialkylated, polyalkylated, and the like. The aromatic can be mono- or poly-functionalized. The hydrocarbyl groups can also be comprised of mixtures of alkyl groups, alkenyl groups, alkynyl, cycloalkyl groups, cycloalkenyl groups and other related hydrocarbyl groups. The hydrocarbyl groups can range from $C_6$ to $C_{60}$ with a range of $C_8$ to $C_{20}$ often being preferred. A mixture of hydrocarbyl groups is often preferred, and up to three such substituents may be present. The hydrocarbyl group can optionally contain sulfur, oxygen, and/or nitrogen containing substituents. The aromatic group can also be derived from natural (petroleum) sources, provided at least 5% of the molecule is comprised of an above-type aromatic moiety. Viscosities at 100° C. of approximately 3 cSt to 50 cSt are preferred, with viscosities of approximately 3.4 cSt to 20 cSt often being more preferred for the hydrocarbyl aromatic component. In one embodiment, an alkyl naphthalene where the alkyl group is primarily comprised of 1-hexadecene is used. Other alkylates of aromatics can be advantageously used. Naphthalene or methyl naphthalene, for example, can be alkylated with olefins such as octene, decene, dodecene, tetradecene or higher, mixtures of similar olefins, and the like. Useful concentrations of hydrocarbyl aromatic in a base oil composition can be 2% to 25%, preferably 4% to 20%, and more preferably 4% to 15%, depending on the application.

Other useful fluids for use as base oils include nonconventional or unconventional base stocks that have been processed, preferably catalytically, or synthesized to provide high performance characteristics.

Non-conventional or unconventional base stocks/base oils include one or more of a mixture of base stock(s) derived from one or more Gas-to-Liquids (GTL) materials, as well as isomerate/isodewaxate base stock(s) derived from natural wax or waxy feeds, mineral and or non-mineral oil waxy feed stocks such as slack waxes, natural waxes, and waxy stocks such as gas oils, waxy fuels hydrocracker bottoms, waxy raffinate, hydrocrackate, thermal crackates, or other mineral, mineral oil, or even non-petroleum oil derived waxy materials such as waxy materials received from coal liquefaction or shale oil, and mixtures of such base stocks.

GTL materials are materials that are derived via one or more synthesis, combination, transformation, rearrangement, and/or degradation/deconstructive processes from gaseous carbon-containing compounds, hydrogen-containing compounds and/or elements as feed stocks such as hydrogen, carbon dioxide, carbon monoxide, water, methane, ethane, ethylene, acetylene, propane, propylene, propyne, butane, butylenes, and butynes. GTL base stocks and/or base oils are GTL materials of base oil viscosity that are generally derived from hydrocarbons; for example, waxy synthesized hydrocarbons, that are themselves derived from simpler gaseous carbon-containing compounds, hydrogen-containing compounds and/or elements as feed stocks. GTL base stock(s) and/or base oil(s) include oils boiling in the lube oil boiling range (1) separated/fractionated from synthesized GTL materials such as, for example, by distillation and subsequently subjected to a final wax processing step which involves either or both of a catalytic dewaxing process, or a solvent dewaxing process, to produce lube oils of reduced/low pour point; (2) synthesized wax isomerates, comprising, for example, hydrodewaxed or hydroisomerized cat and/or solvent dewaxed synthesized wax or waxy hydrocarbons; (3) hydrodewaxed or hydroisomerized catalytic and/or solvent dewaxed Fischer-Tropsch (F-T) material (i.e., hydrocarbons, waxy hydrocarbons, waxes and possible analogous oxygenates); preferably hydrodewaxed or hydroisomerized/followed by catalytic and/or solvent dewaxing dewaxed F-T waxy hydrocarbons, or hydrodewaxed or hydroisomerized/followed by catalytic (or solvent) dewaxing dewaxed, F-T waxes, or mixtures thereof.

GTL base stock(s) and/or base oil(s) derived from GTL materials, especially, hydrodewaxed or hydroisomerized/ followed by catalytic and/or solvent dewaxed wax or waxy feed, preferably F-T material derived base stock(s) and/or base oil(s), are characterized typically as having Kinematic viscosities at 100° C. of from 2 cSt to 50 cSt (ASTM D445). They are further characterized typically as having pour points of −5° C. to −40° C. or lower (ASTM D97). They are also characterized typically as having viscosity indices of 80 to 140 or greater (ASTM D2270).

In addition, the GTL base stock(s) and/or base oil(s) are typically highly paraffinic (>90% saturates), and may contain mixtures of monocycloparaffins and multicycloparaffins in combination with non-cyclic isoparaffins. The ratio of the naphthenic (i.e., cycloparaffin) content in such combinations varies with the catalyst and temperature used. Further, GTL base stock(s) and/or base oil(s) typically have very low sulfur and nitrogen content, generally containing less than 10 ppm, and more typically less than 5 ppm of each of these elements. The sulfur and nitrogen content of GTL base stock(s) and/or base oil(s) obtained from F-T material, especially F-T wax, is essentially nil. In addition, the absence of phosphorous and aromatics make this materially especially suitable for the formulation of low SAP products.

The term GTL base stock and/or base oil and/or wax isomerate base stock and/or base oil is to be understood as embracing individual fractions of such materials of wide viscosity range as recovered in the production process, mixtures of two or more of such fractions, as well as mixtures of one or two or more low viscosity fractions with one, two or more higher viscosity fractions to produce a blend wherein the blend exhibits a target Kinematic viscosity.

The GTL material, from which the GTL base stock(s) and/or base oil(s) is/are derived is preferably an F-T material (i.e., hydrocarbons, waxy hydrocarbons, wax). In addition, the GTL base stock(s) and/or base oil(s) are typically highly paraffinic (>90% saturates), and may contain mixtures of monocycloparaffins and multicycloparaffins in combination with non-cyclic isoparaffins. The ratio of the naphthenic (i.e., cycloparaffin) content in such combinations varies with the catalyst and temperature used. Further, GTL base stock(s) and/or base oil(s) and hydrodewaxed, or hydroisomerized/catalyst (and/or solvent) dewaxed base stock(s) and/or base oil(s) typically have very low sulfur and nitrogen content, generally containing less than 10 ppm, and more typically less than 5 ppm of each of these elements. The sulfur and nitrogen content of GTL base stock(s) and/or base oil(s) obtained from F-T material, especially F-T wax, is essentially nil. In addition, the absence of phosphorous and aromatics make this material especially suitable for the formulation of low sulfur, sulfated ash, and phosphorus (low SAP) products.

Base oils for use in the formulated base oil compositions useful in the present disclosure are any of the variety of oils corresponding to API Group I, Group II, Group III, Group IV, and Group V oils, and mixtures thereof, preferably API Group II, Group III, Group IV, and Group V oils, and mixtures thereof, more preferably the Group III to Group V base oils due to their exceptional volatility, stability, viscometric and cleanliness features. Minor quantities of Group I stock, such as the amount used to dilute additives for blending into formulated lube oil products, can be tolerated but should be kept to a minimum, i.e., amounts only associated with their use as diluents/carrier oil for additives used on an "as-received" basis. Even in regard to the Group II stocks, it is preferred that the Group II stock be in the higher quality range associated with that stock, i.e., a Group II stock having a viscosity index in the range of 100 to 120.

Some base oils may have an ester content≤about 50 wt %, e.g., ≤about 40 wt %, ≤about 30 wt %, ≤about 5.0 wt %, or ≤about 1.0 wt %. Additionally or alternatively, some base oils may have an ester content≥about 40 wt %, e.g., ≥about 50 wt %, ≥about 70 wt %, or ≥about 90 wt %.

Some base oils may have an aromatic contents≤about 15.0 wt %, e.g., ≤about 10.0 wt %, ≤about 5.0 wt %, ≤about 1.0 wt %, ≤about 0.50 wt %, ≤about 0.10 wt %, ≤about 0.05 wt %, ≤about 0.01 wt %, or ≤about 0.005 wt %. Additionally or alternatively, the aromatics content may be ≥about 0.005 wt %, e.g., ≥about 0.01 wt %, ≥about 0.05 wt %, ≥about 0.10 wt %, ≥about 0.5 wt %, ≥about 0.1 wt %, ≥about 1.0 wt %, ≥about 5.0 wt %, or ≥about 10.0 wt %. Ranges of the aromatics content expressly disclosed herein include all combinations of the above-enumerated values, e.g., about 0.005 to about 15.0 wt %, about 0.01 to about 10.0 wt %, about 0.05 to about 5.0 wt %, about 0.10 to about 1.0 wt %, etc.

Some exemplary base oils have be characterized by their Kinematic viscosity at 40° C. (Kv40). For example, particular base oils may have a viscosity≥about 1.0 cSt, e.g., ≥about 1.3 cSt, ≥about 1.5 cSt, ≥about 1.7 cSt, ≥about 1.9 cSt, ≥about 2.1 cSt, ≥about 2.3 cSt, ≥about 2.5 cSt, ≥about 2.7 cSt, ≥about 2.9 cSt, ≥about 3.1 cSt, ≥about 3.3 cSt, ≥about 3.5 cSt, ≥about 3.7 cSt, ≥about 4.0 cSt, ≥about 4.5 cSt, or ≥about 4.8 cSt, at 40° C. Additionally or alternatively, the viscosity at 40° C. may be ≤about 5.0 cSt, e.g., ≤about 4.8 cSt, ≤about 4.5 cSt, ≤about 4.0 cSt, ≤about 3.7 cSt, ≤about 3.5 cSt, ≤about 3.3 cSt, ≤about 3.1 cSt, ≤about 2.9 cSt, ≤about 2.7 cSt, ≤about 2.5 cSt, ≤about 2.3 cSt, ≤about 2.1 cSt, ≤about 1.9 cSt, ≤about 1.7 cSt, ≤about 1.5 cSt, ≤about 1.3 cSt, or ≤about 1.1 cSt, at 40° C. Some such base oils are available from ExxonMobil Chemical Company under the tradename Escaid™, e.g., Escaid™ 110 comprises a desulfurized hydrogenated hydrocarbon containing less than 0.50 wt % aromatics and having a viscosity of about 1.7 cSt at 40° C., Escaid™ 115 having a viscosity of about 2.1 cSt at 40° C., Escaid™ 120 having a flash point above 100° C., and Escaid™ 120 ULA having an aromatics content<0.01 wt %.

Base Oil Additives

Often, the base oil composition includes additional additives. Preferably, one or more of the additional additives form a heterogeneous blend with the base oil. In such aspects, the base oil composition is preferably a heterogeneous blend having base oil as the continuous phase and one or more additional additives as the dispersed or internal phase. Alternatively or additionally, one or more of the additional additives can solubilize in the base oil.

For example, the base oil composition can include additional additives including, but not limited to, an internal phase, which is typically water or a brine (i.e., the base oil composition is an inverted emulsion), a pH buffer, a viscosifier, an emulsifier, a wetting agent, a weighting agent, a fluid loss additive, and a friction reducer.

For example, the base oil composition may include a pH buffer selected from the group consisting of magnesium oxide, potassium hydroxide, calcium oxide, and calcium hydroxide. Commercially available examples of a pH buffer include lime. The pH buffer can be in a concentration in the range of about 0.5 to about 10.0 pounds per barrel (ppb) of the base oil composition. Useful base oil compositions can have a pH ranging from a low of about 7, 8, 9, 10, 11, or 12 to a high of about 14, such as from 10 to 14.

The base oil composition may optionally include a viscosifier. The viscosifier may be selected from the group consisting of inorganic viscosifier, fatty acids, including but not limited to dimer and trimer poly caboxylic fatty acids, diamines, polyamindes, organophilic clays and combinations thereof. Commercially available examples of a suitable viscosifier include, but are not limited to, VG-PLUS™, available from M-I Swaco, a Schlumberger Company; RHEMOD L™, TAU-MOD™, RM-63™, and combinations thereof, marketed by Halliburton Energy Services, Inc. According to an embodiment, the viscosifier is in a concentration of at least 0.5 ppb of the base oil composition. The viscosifier can also be in a concentration in the range of about 0.5 to about 20 ppb, alternatively of about 0.5 to about 10 ppb, of the base oil composition.

The base oil composition may further include a lubricant in addition to the friction-reducing composition described herein. In particular embodiments, the additional base oil composition comprises a particulated material, e.g., graphite such as Steelseal™, available from Halliburton.

The base oil composition can further include an emulsifier. The emulsifier can be selected from the group consisting of tall oil-based fatty acid derivatives such as amides, amines, amidoamines and imidazolines made by reactions of fatty acids and various ethanolamine compounds, vegetable oil-based derivatives, and combinations thereof. Commercially available examples of a suitable emulsifier include, but are not limited to, EZ MUL™ NT, INVERMUL™ NT, LE SUPERMUL™, and combinations thereof, marketed by Halliburton Energy Services, Inc., MEGAMUL™, VersaMul™, VersaCoat™, marketed by MISwaco, a Schlumberger Company. According to an embodiment, the emulsifier is in at least a sufficient concentration such that the base oil composition maintains a stable emulsion or invert emulsion. According to yet another embodiment, the emulsifier is in a concentration of at least 1 ppb of the base oil composition. The emulsifier can also be in a concentration in the range of about 1 to about 20 ppb of the base oil composition.

The base oil composition can further include a weighting agent. The weighting agent can be selected from the group consisting of barite, hematite, manganese tetroxide, calcium carbonate, and combinations thereof. Commercially available examples of a suitable weighting agent include, but are not limited to, BAROID™, BARACARB™, BARODENSE™, and combinations thereof, marketed by Halliburton Energy Services, Inc. and MICROMAX™, marketed by Elkem. According to an embodiment, the weighting agent is in a concentration of at least 10 ppb of the base oil composition. The weighting agent can also be in a concentration in the range of about 10 to about 1000 ppb, such as 10 to 800 ppb, of the base oil composition.

The base oil composition can further include a fluid loss additive. The fluid loss additive can be selected from the group consisting of oleophilic polymers, including cross-linked oleophilic polymers, particulates. Commercially available examples of a suitable fluid loss additive include, but are not limited to VERSATROL™, available from M-I Swaco; N-DRIL™ HT PLUS, ADAPTA™, marketed by Halliburton Energy Services, Inc. The fluid loss additive can also be in a concentration in the range of about 0.5 to about 10 ppb of the base oil composition.

The base oil composition can further include an ester additive. The ester additive can be in a concentration in the range of about 1% to 20%.

The base oil composition may also optionally include one or more metal salts, $MX_y$, where M is a Group 1 or Group 2 metal, X is a halogen, and y is 1 to 2. Exemplary such salts include, NaCl, KCl, $CaCl_2$, $MgCl_2$, etc. The total amount of such salts in the base oil composition is typically about 10-35 wt % in the water phase. Organic additives that lower the water activity may also be used.

Water may also be present in the base oil composition at any convenient concentration, typically at a relatively low concentration, e.g., ≤about 15.0 wt %, ≤about 12.5 wt %, ≤about 10.0 wt %, ≤about 7.5 wt %, ≤about 5.0 wt %, ≤about 2.5 wt %, or ≤about 1.0 wt %, the weight % being based on the total weight of the base oil and the water. Additionally or alternatively, the concentration of water may be ≥about 0.5 wt %, e.g., ≥about 1.0 wt %, ≥about 2.5 wt %, ≥about 5.0 wt %, ≥about 7.5 wt %, ≥about 10.0 wt %, ≥about 12.5 wt %, or ≥about 15.0 wt %. In particular embodiments, the amount of water may be about 1 to about 21 gallons per barrel of base oil composition, such as about 1 to about 10 gallons per barrel of base oil composition. Range of the water content that are expressly disclosed comprise ranges formed from any of the above-enumerated values, e.g., about 0.5 to about 20.0 wt %, about 0.5 to about 15.0 wt %, about 0.5 to about 12.5 wt %, about 0.5 to about 10.0 wt %, about 0.5 to about 7.5 wt %, about 0.5 to about 5.0 wt %, about 0.5 to about 2.5 wt %, about 0.5 to about 1.0 wt %, about 1.0 to about 10.0 wt %, about 1.0 to about 7.5 wt %, about 1.0 to about 5.0 wt %, about 1.0 to about 2.5 wt %, about 2.5 to about 10.0 wt %, about 2.5 to about 7.5 wt %, about 2.5 to about 5.0 wt %, about 5.0 to about 10.0 wt %, about 5.0 to about 7.5 wt %, etc.

The base oil composition can further include wetting agents. The wetting agents can be selected from the group consisting of tall oil-based fatty acid derivatives such as amides, amines, amidoamines and imidazolines made by reactions of fatty acids and various ethanolamine compounds, vegetable oil-based derivatives, and combinations thereof. Commercially available examples of a suitable wetting agent include, but are not limited to, DrillTreat™, OMC™, marketed by Halliburton Energy Services, Inc., VersaWet™, marketed by MISwaco, a Schlumberger Company. According to an embodiment, the wetting agent is in at least a sufficient concentration such that the base oil composition maintains a stable emulsion or invert emulsion. According to yet another embodiment, the wetting agent is in a concentration of at least 0.25 ppb of base oil composition. The wetting agent can also be in a concentration in the range of about 0.05 to about 20 ppb, such as about 0.25 to about 20 ppb of the base oil composition.

In another embodiment, the wetting agent is not present in the base oil composition.

Friction-Reducing Composition

Lubricant compositions according to the instant invention also include at least one friction-reducing composition comprising a compound represented by Formula I:

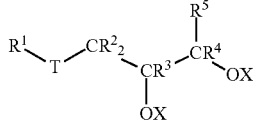

Formula I

In Formula I, each of $R^1$, $R^2$, $R^3$, $R^4$, and $R^5$ is independently selected from the group consisting of H and branched or unbranched, substituted or unsubstituted $C_1$ to $C_{50}$ hydrocarbyl groups. Exemplary $C_1$ to $C_{50}$ hydrocarbyl groups include, but are not limited to, $C_1$ to $C_{30}$, and $C_1$ to $C_{25}$, $C_1$ to $C_{20}$, $C_5$ to $C_{25}$, $C_5$ to $C_{20}$, $C_5$ to $C_{15}$, $C_5$ to $C_{10}$, $C_{10}$ to $C_{30}$, $C_{10}$ to $C_{25}$, $C_{10}$ to $C_{20}$, and $C_{15}$ to $C_{25}$ hydrocarbyl groups, e.g., may be independently selected from n-dodecyl (lauryl), n-tetradecyl (myristyl), n-hexadecyl (palmityl), n-octadecyl (stearyl), n-9-octadecenyl (oleyl), and n-eicosenyl groups. The hydrocarbyl groups are not limited to unbranched hydrocarbyl groups, e.g., $C_8$ hydrocarbyl groups include, but are not limited to, e.g., 2-ethylhexyl and 2-propylpentyl groups. Exemplary unsubstituted, unbranched hydrocarbyl groups include methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl hydrocarbyl groups.

Likewise, in Formula I, T is selected from the group consisting of O, S, and C(O)O groups. In particular embodiments, T is S or C(O)O.

In Formula I, X is typically H, but may also be selected from branched or unbranched, substituted or unsubstituted $C_1$ to $C_{50}$ hydrocarbyl groups, acyl groups having a formula of RC(O)— wherein R may be a branched or unbranched, substituted or unsubstituted $C_1$ to $C_{50}$ hydrocarbyl group, an ester group having a formula of RC(O)O—, where R may be a branched or unbranched, substituted or unsubstituted $C_1$ to $C_{50}$ hydrocarbyl group, Group 1-2 metals, $NR_4^+$ and $PR_4^+$ groups, where each R group is independently selected from H and hydrocarbyl groups. Particular $C_1$ to $C_{50}$ hydrocarbyl groups include, but are not limited to, $C_1$ to $C_{30}$, $C_1$ to $C_{25}$, $C_1$ to $C_{20}$, $C_5$ to $C_{25}$, $C_5$ to $C_{20}$, $C_5$ to $C_{15}$, $C_5$ to $C_{10}$, $C_{10}$ to $C_{30}$, $C_{10}$ to $C_{25}$, $C_{10}$ to $C_{20}$, and $C_{15}$ to $C_{25}$ hydrocarbyl groups, e.g., may be independently selected from n-dodecyl (lauryl), n-tetradecyl (myristyl), n-hexadecyl (palmityl), n-octadecyl (stearyl), n-9-octadecenyl (oleyl), and n-eicosenyl groups 2-ethylhexyl and 2-propylpentyl groups; methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl hydrocarbyl groups as described for $R^1$ to $R^5$. In any embodiment, at least one X is selected from the $C_1$-$C_{50}$ hydrocarbyl groups described above. In any embodiment, each X is selected from the $C_1$-$C_{50}$ hydrocarbyl groups described above.

In particular embodiments, the compound according to Formula I comprises glycerol monostearate, glycerol monooleate, glycerol di-stearate, glycerol di-oleate, glycerol tri-stearate, or glycerol tri-oleate.

In any embodiment, the friction-reducing composition may comprise a compound represented by Formula II:

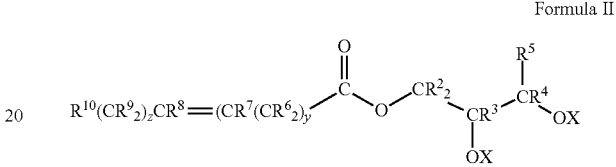

Formula II

In Formula II, each of $R^2$, $R^3$, $R^4$ and $R^5$ and each X is as described in Formula I. The variable y in Formula II may be $\geq 1$, e.g., $\geq 2$, $\geq 5$, $\geq 7$, $\geq 8$, $\geq 10$, $\geq 12$, $\geq 14$, $\geq 16$, $\geq 18$, $\geq 20$, $\geq 22$, $\geq 24$, $\geq 26$, $\geq 28$, $\geq 30$, $\geq 32$, $\geq 34$, $\geq 36$, $\geq 38$, $\geq 40$, $\geq 42$, or $\geq 44$. Additionally or alternatively, y may be $\leq 47$, e.g., $\leq 44$, $\leq 42$, $\leq 40$, $\leq 38$, $\leq 36$, $\leq 34$, $\leq 32$, $\leq 30$, $\leq 28$, $\leq 26$, $\leq 24$, $\leq 22$, $\leq 20$, $\leq 18$, $\leq 16$, $\leq 14$, $\leq 12$, $\leq 10$, $\leq 8$, $\leq 7$, or $\leq 5$. In Formula II, z may be $\geq 0$, e.g., $\geq 1$, $\geq 5$, $\geq 7$, $\geq 8$, $\geq 10$, $\geq 12$, $\geq 14$, $\geq 16$, $\geq 18$, $\geq 20$, $\geq 22$, $\geq 24$, $\geq 26$, $\geq 28$, $\geq 30$, $\geq 32$, $\geq 34$, $\geq 36$, $\geq 38$, $\geq 40$, $\geq 42$, or $\geq 44$. Additionally or alternatively, z may be $\leq 47$, e.g., $\leq 44$, $\leq 42$, $\leq 40$, $\leq 38$, $\leq 36$, $\leq 34$, $\leq 32$, $\leq 30$, $\leq 28$, $\leq 26$, $\leq 24$, $\leq 22$, $\leq 20$, $\leq 18$, $\leq 16$, $\leq 14$, $\leq 12$, $\leq 10$, $\leq 8$, $\leq 7$, or $\leq 5$. Ranges of y and z values that are expressly disclosed herein include ranges formed by any combination of the above-recited individual values. In particular embodiments, y ranges from about 5 to about 10, e.g., 7, and z ranges from about 5 to about 10, e.g., 7, i.e., $CH_3(CH_2)_7C=C(CH_2)_7$—, also referred to as an oleyl group. The double bond may have cis- or trans-configuration. In particular embodiments, the cis-configuration may be particularly useful.

In Formula II, each $R^6$, $R^7$, $R^8$, and $R^9$ group is individually selected from H and branched or unbranched, substituted or unsubstituted $C_1$ to $C_{20}$ hydrocarbyl groups. Exemplary $C_1$ to $C_{20}$ hydrocarbyl groups include, but are not limited to, $C_2$ to $C_{18}$, and $C_4$ to $C_{16}$, $C_6$ to $C_{14}$, $C_8$ to $C_{12}$, and $C_{10}$ groups. The $R^6$, $R^7$, $R^8$, and $R^9$ hydrocarbyl groups are not limited to unbranched hydrocarbyl groups, e.g., $C_8$ hydrocarbyl groups include, but are not limited to, e.g., 2-ethylhexyl and 2-propylpentyl groups. Exemplary unsubstituted, unbranched hydrocarbyl groups include methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl hydrocarbyl groups.

In Formula II, the $R^{10}$ group is selected from the group consisting of H and branched or unbranched, substituted or unsubstituted $C_1$ to $C_{20}$ hydrocarbyl groups. The hydrocarbyl groups of $R^{10}$ are not limited to unbranched hydrocarbyl groups, e.g., $C_8$ hydrocarbyl groups include, but are not limited to, e.g., 2-ethylhexyl and 2-propylpentyl groups. Exemplary unsubstituted, unbranched $R^{10}$ hydrocarbyl groups include methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl hydrocarbyl groups.

In other embodiments, $R^{10}$ may provide a polyethylene glycol functionality to the compound. Thus, in some embodiments, $R^{10}$ comprises a polyethylene glycol group having the formula —O(CH$_2$CH$_2$O)$_n$R', wherein R' may be H or a branched or unbranched, substituted or unsubstituted $C_1$ to $C_{20}$ hydrocaryl group, e.g., $C_1$ to $C_{20}$ hydrocarbyl groups include, but are not limited to, $C_2$ to $C_{18}$, and $C_4$ to $C_{16}$, $C_6$ to $C_{14}$, $C_8$ to $C_{12}$, and $C_{10}$ groups. The $R^{10}$ hydrocarbyl groups are not limited to unbranched hydrocarbyl groups, e.g., $C_8$ hydrocarbyl groups include, but are not limited to, e.g., 2-ethylhexyl and 2-propylpentyl groups. Exemplary unsubstituted, unbranched hydrocarbyl groups include methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl hydrocarbyl groups. In such embodiments, the number of polyethylene glycol units, n, is ≥1, e.g., ≥2, ≥5, ≥7, ≥10, ≥12, ≥15, ≥17, ≥20, ≥22, ≥25, ≥27, ≥30, ≥35, ≥40, or ≥45. Additionally or alternatively, n may be ≤50, e.g., ≤45, ≤40, ≤35, ≤30, ≤27, ≤25, ≤22, ≤20, ≤17, ≤15, ≤12, ≤10, ≤5, or ≤2. Ranges of the number of polyethylene glycol units, n, expressly disclosed herein comprise ranges formed by any of the above-enumerated values, e.g., 1 to 50, 1 to 45, 1 to 40, 1 to 35, 1 to 30, 1 to 27, 1 to 25, 1 to 22, 1 to 20, 1 to 17, 1 to 15, 1 to 12, 1 to 10, 1 to 7, 1 to 5, 1 to 2, 2 to 50, 2 to 45, 2 to 40, 2 to 35, 2 to 30, 2 to 27, 2 to 25, 2 to 22, 2 to 20, 2 to 17, 2 to 15, 2 to 12, 2 to 10, 2 to 7, 2 to 5, etc., particularly 1 to 50, 2 to 45, 5 to 40, 7 to 35, 10 to 30, 12 to 27, 15 to 25, 17 to 22, about 20. Such compounds are referred to herein as "PEG-terminated" compounds.

In any embodiment, the friction-reducing composition may comprise a compound represented by Formula III:

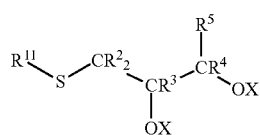

Formula III

In Formula III, each of $R^2$, $R^3$, $R^4$, and $R^5$ and each X is as described in Formula I. $R^{11}$ is as described for $R^1$ in Formula I. $R^{11}$ is as described for $R^1$ in Formula I. In particular embodiments, $R^{11}$ may be a decyl, undecyl, dodecyl, 2-methyl-1-undecyl, tridecyl, tetradecyl, pentadecyl, hexadecyl, heptadecyl, octadecyl, nonadecyl, or eicosadecyl group, particularly $R^{11}$ may be a hexadecyl, octadecyl, or eicosadecyl group, more particularly $R^{11}$ may be an octadecyl group.

In other embodiments, $R^{11}$ may provide a polyethylene glycol functionality to the compound as described above for $R^{10}$. Thus, $R^{11}$ comprises a polyethylene glycol group having the formula —O(CH$_2$CH$_2$O)$_n$R', wherein R' may be H or a branched or unbranched, substituted or unsubstituted $C_1$ to $C_{20}$ hydrocaryl group, e.g., $C_1$ to $C_{20}$ hydrocarbyl groups include, but are not limited to, $C_2$ to $C_{18}$, and $C_4$ to $C_{16}$, $C_6$ to $C_{14}$, $C_8$ to $C_{12}$, and $C_{10}$ groups, e.g., 2-ethylhexyl, 2-propylpentyl groups, methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, etc., hydrocarbyl groups. In such embodiments, the number of polyethylene glycol units, n, is ≥1, e.g., ≥2, ≥5, ≥7, ≥10, ≥12, ≥15, ≥17, ≥20, ≥22, ≥25, ≥27, ≥30, ≥35, ≥40, or ≥45. Additionally or alternatively, n may be ≤50, e.g., ≤45, ≤40, ≤35, ≤30, ≤27, ≤25, ≤22, ≤20, ≤17, ≤15, ≤12, ≤10, ≤5, or ≤2. Ranges of the number of polyethylene glycol units, n, expressly disclosed herein comprise ranges formed by any of the above-enumerated values, e.g., 1 to 50, 1 to 45, 1 to 40, 1 to 35, 1 to 30, 1 to 27, 1 to 25, 1 to 22, 1 to 20, 1 to 17, 1 to 15, 1 to 12, 1 to 10, 1 to 7, 1 to 5, 1 to 2, 2 to 50, 2 to 45, 2 to 40, 2 to 35, 2 to 30, 2 to 27, 2 to 25, 2 to 22, 2 to 20, 2 to 17, 2 to 15, 2 to 12, 2 to 10, 2 to 7, 2 to 5, etc., particularly 1 to 50, 2 to 45, 5 to 40, 7 to 35, 10 to 30, 12 to 27, 15 to 25, 17 to 22, about 20.

In particular embodiments, the compound according to Formula II comprises thioglycerol monostearate, thioglycerol mono-oleate, thioglycerol di-stearate, or thioglycerol di-oleate. In other embodiments, the compound according to Formula II comprises octadecyl thioglycerol, octadecyl thioglycerol monostearate, thioglycerol mono-oleate.

The thioglycerols according to Formula III may be made by any convenient method. One such method is the alkylation of thioglycerol with the selected hydrocarbyl bromide in the presence of a base, e.g., $K_2CO_3$, as shown in Scheme I.

Scheme I

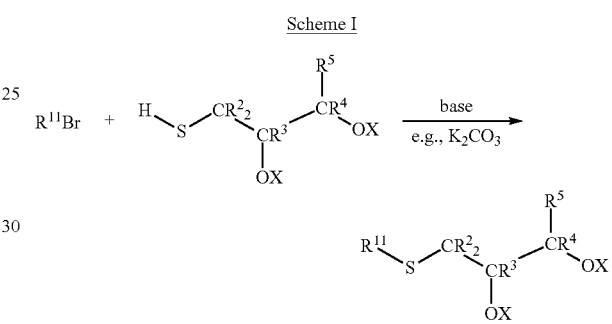

Embodiments of the invention may also include an alternative method of making such substituted thioglycerols. As shown in Scheme II, thioglycerols may be prepared via photochemical reaction of the selected olefin and the selected thioglycerol in the presence of a catalytic amount of 2,2,dimethoxy-2-phenylacetophenone (DMPA).

Scheme II

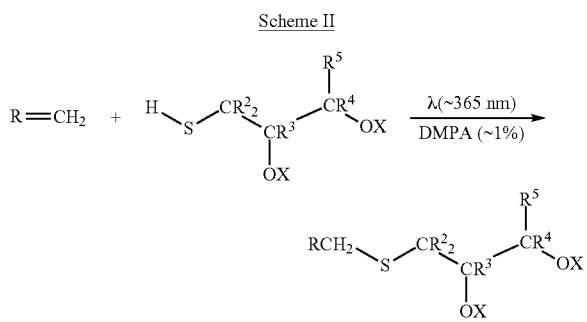

While scheme II depicts the reaction of an alpha-olefin, embodiments of the invention are not limited thereto. Internal olefins may also be used. One of ordinary skill in the art will understand how to select an appropriate olefin to give the desired $R^{11}$ group of Formula II. For example, where the desired group is dodecyl, 1-dodecene may be used in scheme II. Thus, alkenes corresponding to any $R^{11}$ group described herein are also expressly described herein, e.g., in particular embodiments, $R^{11}$ may be a 1-decene, 1-undecene, 2-methyl-1-undecyl, 1-dodecene, 2-dodecene, 3-dodecene, 1-tridecene, 11-methyl-1-dodecene, 1-tetradecene, 1-pentadecene, 1-hexadecene, 1-heptadecene, 1-octadecene, 1-nonadecene, or eicosadecyl group, PEG-terminated alkene, etc. Particularly, $R^{11}$ may be a hexadecyl, octadecyl, or eicosadecyl group, more particularly $R^{11}$ may be an octadecyl group.

The friction-reducing composition may optionally include one or more secondary friction-reducing components. Secondary friction-reducing components may be selected from hydrocarbyl diols, particularly wherein the hydrocarbyl group is selected from $C_{10}$ to $C_{25}$ alkyl groups e.g., octadecane-1-2-diol (described in concurrently filed U.S. Ser. No. 15/392,472, corresponding to U.S. Ser. No. 62/186,494 filed Jun. 30, 2015, entitled "Lubricant Compositions and Methods of Making and Using Same"; glycerol carbamates; e.g., oleyl glycerol carbamate (described in concurrently filed U.S. Ser. No. 15/171,820, corresponding to U.S. Ser. No. 62/186,503 filed Jun. 30, 2015, entitled "Glycerol Carbamate Based Lubricant Compositions and Methods of Making and Using Same"; phosphate esters and dihydrocarbyl hydrogen phosphites and polyethyleneglycol-containing hydrocarbyl ether phosphate esters (described in concurrently filed U.S. Ser. No. 15/171,837, corresponding to U.S. Ser. No. 62/186,516, filed Jun. 30, 2015, entitled "Lubricant Compositions Containing Phosphates and/or Phosphites and Methods of Making and Using Same" and certain amides and imidazolides, (described in concurrently filed U.S. Ser. No. 15/171,835, corresponding to U.S. Ser. No. 62/186,509, filed Jun. 30, 2015, entitled "Lubricant Compositions and Methods of Making and Using Same", each of which is incorporated by reference in its entirety as a part of this disclosure.

Useful secondary friction-reducing components include, e.g., Vikinol™ 18, ColaLube™ 3410, ColaLube™ 3407, and additives under the tradename ColaMid™.

The secondary friction-reducing component may be present in the friction reducing composition in an amount≥about 5.0 wt %, e.g., ≥about 10.0 wt %, ≥about 15.0 wt %, ≥about 20.0 wt %, ≥about 25.0 wt %, ≥about 30.0 wt %, ≥about 35.0 wt %, ≥about 40.0 wt %, ≥about 45.0 wt %, ≥about 50.0 wt %, ≥about 55.0 wt %, ≥about 60.0 wt %, ≥about 65.0 wt %, ≥about 70.0 wt %, ≥about 75.0 wt %, ≥about 80.0 wt %, ≥about 85.0 wt %, or ≥about 90.0 wt %, based on the total weight of the friction-reducing composition. Additionally or alternatively, the secondary fiction-reducing component may be present in an amount≤about 95 wt %, e.g., ≤about 90.0 wt %, ≤about 85.0 wt %, ≤about 80.0 wt %, ≤about 75.0 wt %, ≤about 70.0 wt %, ≤about 65.0 wt %, ≤about 60.0 wt %, ≤about 55.0 wt %, ≤about 50.0 wt %, ≤about 45.0 wt %, ≤about 40.0 wt %, ≤about 35.0 wt %, ≤about 30.0 wt %, ≤about 25.0 wt %, ≤about 20.0 wt %, ≤about 15.0 wt %, or ≤about 10.0 wt %, based on the total weight of the friction-reducing composition. Ranges of the amount of secondary friction-reducing component that are expressly disclosed herein include ranges formed by any combination of the above-recited individual values, e.g., about 5.0 to about 95.0 wt %, about 10.0 to about 90.0 wt %, about 15.0 to about 85.0 wt %, about 20.0 to about 80.0 wt %, about 25.0 to about 75.0 wt %, about 30.0 to about 70.0 wt %, about 35.0 to about 65.0 wt %, about 40.0 to about 60.0 wt %, about 45.0 to about 55.0 wt %, etc.

Methods of Making the Lubricant Composition

Lubricant compositions described herein can be made by mixing a friction-reducing composition described above and at least one base oil composition comprising about 1.0 to about 15.0 wt % water. The method may additionally include mixing the base oil composition prior to blending with the friction-reducing agent. In some embodiments, the mixture of the base oil composition and the friction reducing agent is heated during mixing, e.g., for 5-48 hours at a temperature of about 30 to about 70° C., e.g., about 24 hours at about 60° C. In some methods, the heating includes providing a nitrogen head pressure to the heating vessel of about 30 to about 50 psi. Mixing at speeds of about 2000 to about 5000 rpm. Typically, mixtures are cooled for 10-24 hours at about 25° C. before testing or use.

Methods of Drilling

Lubricant compositions described herein are useful in any number of drilling methods. One exemplary method comprises mixing a friction-reducing composition and at least one base oil composition comprising about 1.0 to about 15.0 wt % water; and introducing the lubricant composition into the well.

The step of introducing can comprise pumping the lubricant composition into the well. The pumping may be done continuously, i.e., providing a constant flow of lubricant composition, periodically, or intermittently, i.e., alternating between periods of flow and no flow of lubricant composition. Particular methods further include continuously, periodically, or intermittently providing a second amount of friction-reducing composition to the lubricant composition already provided to the well. In some methods, the continuous provision of the friction-reducing composition provides an overall reduction in the amount of friction-reducing agent used during the drilling process. Alternatively, the continuous provision of the friction-reducing agent may allow smoother drilling operation of the drilling process. The well can be, without limitation, an oil, gas, or water production well, or an injection well. Methods may further include one or more steps of advancing a downhole tool in the well.

The introduced lubricant composition may be exposed to temperatures in the well ranging from a low of about 70° C., 80° C., 90° C., 100° C., or 125° C. to a high of about 170° C., and pressures ranging from ambient pressure to a high of about 100 bar (10,000 kPa), 200 bar (20,000 kPa), 300 bar (30,000 kPa), 400 bar (40,000 kPa), 500 bar (50,000 kPa), or 600 bar (60,000 kPa). The introduced lubricant composition may be utilized when system components have rotation speed of ≤about 1000 rpm, e.g., ≤about 800 rpm, ≤about 700 rpm, and ≥about 0 rpm, such as from 1 to 1000 rpm. The introduced lubricant composition may also be utilized with minimal rotation but instead longitudinal motion at a speed of ≤10,000 m/hr (meters per hour); ≤1,000 m/hr; ≤100; and/or ≤10 m/hr.

According to an embodiment, the well penetrates a reservoir or is located adjacent to a reservoir. The methods can further include the step of removing at least a portion of the lubricant composition after the step of introducing. The methods can include any number of additional optional steps. For example, some methods include one or more of the following optional steps: mounting and cementing of well pipes in the first well; mounting of a blowout preventer or lubricator in the top of the well; drilling, at a distance from the well, a second well against a section of the first well to the effect that the second well gets into operational contact with the first well; mounting and cementing of well pipes in the second well; mounting of a blowout preventer or lubricator in the top of the second well; whereafter the drilling from one of the first or second well continues down into the reservoir and the other well which is not drilled to the reservoir is filled wholly or partially with a fluid and a drilling tool is placed in the other well and the other well is subsequently closed so that the other well can be accessed at a later point in time, and that the tool is left in the other well so that this tool can establish a connection to the one of the first or second wells into which the drilling continued.

Still other optional steps include one or more of the following: calculating a desired path for a well of interest relative to a reference well; measuring a position of the well of interest relative to the reference well at a location along a wellbore of the well; calculating an actual path of the well of interest based at least in part on the measured position of the well of interest relative to the at least one reference well; comparing the actual path of the at least one well of interest to the desired path of the well of interest; and adjusting a drilling system to modify the actual path of the well of interest based at least in part on a deviation between the actual path of the well of interest and the desired path of the well of interest.

Experimental

Viscosity Index is determined from the Kinematic viscosity according to ASTM D2270-10e1.

Kinematic Viscosity is determined according to ASTM D445.

Coefficient of Friction (CoF) is determined using a block-on-ring tribometer available from CETR, Inc., USA. The block is made of P110 steel and the ring is a nitrided Timken ring having a radius of 17.5 mm (35 m OD) and a width of 6.35 mm. The blocks are machined to a final surface roughness, $R_a$, of 0.18 µm. The ring has a surface roughness, $R_a$, of about 0.01 µm. The ring is partially submerged into 100 ml of the fluid to be tested such that about 10 ml of the ring is beneath the surface of the fluid. The block applies a 5.6 kg load on the ring. Testing is performed at 25° C. The ring is turned at 25 rpm, 50 rpm, 100 rpm, 250 rpm, 500 rpm, and 750 rpm for 4 minutes, at each speed to obtain the Stribeck response of the fluid. It should be noted that initial measurements may be significantly affected by changes in the contacting surfaces, reaction of surface active components, entrainment of fluid in the inlet zone of the instrument, etc. Care should be taken to allow steady state operation to be achieved before the coefficient of friction is recorded. Typically, steady state boundary friction response is obtained by continuing the test for an additional 30 min at 25 rpm. The steady state boundary friction response is reported as the coefficient of friction is the results reported herein.

Operating Torque: Drilling operations may be constrained due to torque limits at the drilling rig. The constraints may be due to maximum torque that a driver can deliver and/or the maximum torque that the drilling string can withstand before metal failure will occur; such constraints are therefore different for different drilling rigs due to either the size of the driver and/or the drill string in use. The Operating Torque can be measured by a dedicated device (e.g., a torque sub) and/or by measured power usage by the driver. Typically drilling operations are conducted with at least a 10% safety margin between the Operating Torque and the torque limit. When the Operating Torque is nearing or exceeding what is considered to be a reasonable value, this will limit the length of the wellbore that is achievable. Operating changes can be performed to reduce the Operating Torque, e.g., reducing the rate of penetration (the forward rate of drilling), removing accumulated cuttings from the wellbore, removing the drill string from the wellbore and replacing/refurbishing worn components, and/or reducing the amount of low gravity solids (ground down cuttings) from the circulating base oil composition. These steps to reduce the operating torque can be expensive and time consuming, and may offer little benefit. Therefore use of a friction reduction additive is beneficial to reduce the operating torque so as to increase rate of penetration and/or allow for greater length of the wellbore.

Example 1

In Example 1, a base oil composition comprising about 210 g Escsaid™ 110, about 8.0 g VG Plus™, and about 7 g of lime are added and mixed for about 5 min. About 9.0 g of MegaMul™ is added to the resulting mixture followed by about 5 min. of further mixing. About 18.5 g calcium chloride is mixed with about 50 ml of water and added to the mixture, followed by about 225 g of barite weighting agent. The combination is mixed for about 10 min. before addition of about 6.0 grams of Versitrol M™ followed by an additional 5 min. of mixing. Thereafter, about 45.0 g of Rev Dust™ is added followed by 10 min. of mixing. The base oil composition is hot aged for about 16 hours at a temperature of about 120° C. The coefficient of friction (CoF) of the base oil composition is measured as a baseline and reported in Table I.

Example 2

In Example 2, Example 1 is substantially repeated, except that the composition comprises about 97 wt % of composition of Example 1 and about 3 wt % of a conventional friction reducing agent available under the tradename Ultralube II, available from Integrity Industries, Inc., Kingsville, Tex., USA. The mixture is covered and heated to about 60° C. while being mixed for about 60 min. The sample is cooled at about 25° C. for 16 hrs. The cooled sample is mixed for about 30 min. at about 4000 rpm. The coefficient of friction (CoF) of the sample is reported in Table I.

Example 3

In Example 3, Example 2 is substantially repeated, except that the composition comprises about 97 wt % of composition of Example 1 and about 3 wt % octadecyl thioglycerol. The coefficient of friction (CoF) of the base oil composition and additive package is reported in Table I.

Example 4

In Example 4, Example 2 is substantially repeated, except that the composition comprises about 97 wt % of composition of Example 1 and about 3 wt % glycerol monostearate. The coefficient of friction (CoF) of the base oil composition and additive package is reported in Table I.

TABLE I

|  | Ex. 1 | Ex. 2 | Ex. 3 | Ex. 4 |
|---|---|---|---|---|
| CoF | 0.17 | 0.14 | 0.11 | 0.10 |
| Relative CoF* | 1 | 0.82 | 0.65 | 0.59 |
| % Reduction CoF** | — | 18 | 34 | 41 |

*Relative CoF is as compared to Example 1.
**% Reduction CoF = 1 − Relative CoF.

Particular Embodiments

This invention further relates to:

Embodiment 1

A lubricant composition suitable for use in drilling operations, comprising:

a) about 90.0 to 99.0 wt % of at least one base oil composition, the base oil composition comprising about 1.0 to about 15.0 wt % water, and b) from about 1.0 to about 10.0 wt % of a friction-reducing composition comprising: at least one compound represented by Formula I:

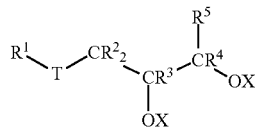

Formula I wherein each of $R^1$, $R^2$, $R^3$, $R^4$, and $R^5$ is selected from the group consisting of H and branched or unbranched, substituted or unsubstituted $C_1$ to $C_{50}$ hydrocarbyl groups;

T is selected from the group consisting of O, S, and C(O)O groups; and

X is selected from H, branched or unbranched, substituted or unsubstituted $C_1$ to $C_{50}$ hydrocarbyl groups, acyl groups having a formula of R*C(O)— wherein R* is a branched or unbranched, substituted or unsubstituted $C_1$ to $C_{50}$ hydrocarbyl group, an ester group having a formula of R"C(O)O—, where R" is a branched or unbranched, substituted or unsubstituted $C_1$ to $C_{50}$ hydrocarbyl group, Group 1-2 metals, $NR_4^+$ and $PR_4^+$ groups, where each R group is independently selected from H and hydrocarbyl groups.

Embodiment 2

The composition of Embodiment 1, wherein T is C(O)O and $R^1$ is selected from $C_{10}$ to $C_{30}$ hydrocarbyl groups.

Embodiment 3

The composition of Embodiment 1, wherein T is C(O)O and $R^1$ is selected from n-dodecyl (lauryl), n-tetradecyl (myristyl), n-hexadecyl (palmityl), n-octadecyl (stearyl), n-9-octadecenyl (oleyl), and n-eicosenyl groups.

Embodiment 4

The composition of Embodiment 1, wherein T is C(O)O or C(O) and $R^1$ and at least one X are selected from n-dodecyl (lauryl), n-tetradecyl (myristyl), n-hexadecyl (palmityl), n-octadecyl (stearyl), n-9-octadecenyl (oleyl), and n-eicosenyl groups, wherein $R^1$ and the at least one X may be the same or different.

Embodiment 5

Embodiment 1, wherein T is C(O)O and $R^1$ is selected from n-dodecyl (lauryl), n-tetradecyl (myristyl), n-hexadecyl (palmityl), n-octadecyl (stearyl), n-9-octadecenyl (oleyl), and n-eicosenyl groups, and at least one X is H.

Embodiment 6

The composition of Embodiment 1, wherein the compound according to Formula I is selected from glycerol monostearate, glycerol mono-oleate, glycerol di-stearate, and glycerol di-oleate.

Embodiment 7

The composition of Embodiment 1, wherein T is O or S and $R^1$ is selected from $C_{10}$ to $C_{30}$ hydrocarbyl groups.

Embodiment 8

The composition of Embodiment 1, wherein T is O or S and $R^1$ is selected from n-dodecyl (lauryl), n-tetradecyl (myristyl), n-hexadecyl (palmityl), n-octadecyl (stearyl), n-9-octadecenyl (oleyl), and n-eicosenyl groups.

Embodiment 9

The composition of Embodiment 1, wherein T is O or S and $R^1$ and at least one X is selected from n-dodecyl (lauryl), n-tetradecyl (myristyl), n-hexadecyl (palmityl), n-octadecyl (stearyl), n-9-octadecenyl (oleyl), and n-eicosenyl groups, wherein $R^1$ and the at least one X may be the same or different.

Embodiment 10

The composition of Embodiment 1, wherein T is O or S and $R^1$ is selected from n-dodecyl (lauryl), n-tetradecyl (myristyl), n-hexadecyl (palmityl), n-octadecyl (stearyl), n-9-octadecenyl (oleyl), and n-eicosenyl groups, and at least one X is H.

Embodiment 11

The composition of Embodiment 11, wherein the compound according to Formula I is selected from glycerol monostearate, glycerol mono-oleate, glycerol di-stearate, and glycerol di-oleate.

Embodiment 12

A method of making a lubricant composition suitable for use in drilling operations, comprising:

a) providing at least one base oil composition, the base oil composition comprising about 1.0 to about 15.0 wt % water, and combining about 90.0 to about 99.0 wt % of the base oil composition with about 1.0 to about 10.0 wt % of the friction-reducing composition, of any of Embodiments 1 to 11.

Embodiment 13

A lubricant composition suitable for use in drilling operations made by the process, comprising:

a) providing at least one base oil composition, the base oil composition comprising about 1.0 to about 15.0 wt % water, and b) combining the base oil composition with the friction-reducing composition of any of Embodiments 1 to 11 to achieve a concentration of the friction reducing agent of about 1.0 to about 10.0 wt %, based on the weight of the base oil composition and the friction-reducing composition, the friction reducing composition.

Embodiment 14

A method of drilling a wellbore comprising:

a) providing at least one base oil composition to the wellbore, the base oil composition comprising about 1.0 to about 15.0 wt % water, and b) providing a friction-reducing composition of any of Embodiments 1 to 11 to the wellbore to achieve a concentration of the friction reducing agent of about 1.0 to about 10.0 wt %, based on the weight of the base oil composition and the friction-reducing composition.

Embodiment 15

A method of providing a lubricant composition to a drilling operation, comprising:

a) providing to said drilling operation at least one base oil composition, the base oil composition comprising about 1.0 to about 15.0 wt % water, b) operating said drilling operation for a period of time with said base oil composition, and c) adding to the drilling operation a friction-reducing composition of any of Embodiments 1 to 11.

Embodiment 16

The method of Embodiment 15 wherein adding the friction-reducing composition comprises adding the friction-reducing composition at a rate sufficient to provide a concentration of the friction-reducing additive in the lubricant composition of about 0.5% to about 10.0 wt % after a time period of about 3 hours to 40 days.

Embodiment 17

The method of Embodiment 15, wherein said drilling operation comprises one or more of: introducing a drill string; introducing coiled tubing; introducing casing; introducing screens; introducing tools for cleaning, fracturing, and perforating; rotating drill string; advancing the wellbore; withdrawing a drill string; and withdrawing coiled tubing.

Embodiment 18

The method of Embodiment 15, wherein adding the friction-reducing composition comprises adding the friction-reducing composition intermittently maintain a desired Operating Torque.

Embodiment 19

The method of Embodiment 15 wherein said drilling operation has an Operating Torque<95%, preferably <90%, more preferably less than 85%, most preferably less than 80% of the Operating Torque when performing the same drilling operation with the base oil composition lacking the friction reducing composition, particularly wherein the Operating Torque.

Embodiment 20

A method of preparing a well bore comprising providing a lubricant composition according to any of Embodiments 1 to 11 to a well bore.

Embodiment 21

A method of producing hydrocarbons comprising providing a lubricant composition according to any of Embodiments 1 to 11 to a well bore.

Embodiment 22

A method of making a thioglycerol compound, comprising, photochemically reacting an alkene and a thioglycerol precursor in the presence of a catalyst to produce a reaction mixture comprising a compound represented by Formula III:

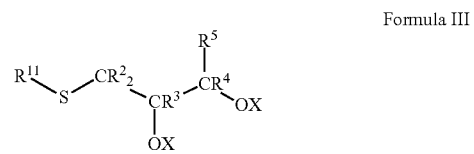

Formula III each $R^2$ to $R^5$ may be selected from the group consisting of H and branched or unbranched, substituted or unsubstituted $C_1$ to $C_{50}$ hydrocarbyl groups; and each X may be independently selected from H, branched or unbranched, substituted or unsubstituted $C_1$ to $C_{50}$ hydrocarbyl groups, acyl groups having a formula of RC(O)— wherein R may be a branched or unbranched, substituted or unsubstituted $C_1$ to $C_{50}$ hydrocarbyl group, an ester group having a formula of RC(O)O—, where R may be a branched or unbranched, substituted or unsubstituted $C_1$ to $C_{50}$ hydrocarbyl group, Group I-II metals, $NR_4^+$ and $PR_4^+$ groups, where each R group is independently selected from H and hydrocarbyl groups. $R^{11}$ may be as described for $R^1$ in Formula I. In particular embodiments, $R^{11}$ may be a decyl, undecyl, dodecyl, 2-methyl-1-undecyl, tridecyl, tetradecyl, pentadecyl, hexadecyl, heptadecyl, octadecyl, nonadecyl, or eicosadecyl group, particularly $R^{11}$ may be a hexadecyl, octadecyl, or eicosadecyl group, more particularly $R^{11}$ may be an octadecyl group.

Embodiment 23

The method of Embodiment 22, wherein the catalyst comprises a 2,2,dialkoxy-2-phenylacetophenone, particularly 2,2,dimethoxy-2-phenylacetophenone.

Embodiment 24

The method of Embodiment 22 or 23, wherein the alkene is selected from $C_1$ to $C_{50}$ alkenes, e.g., $C_1$ to $C_{30}$, and $C_1$ to $C_{25}$, $C_1$ to $C_{20}$, $C_5$ to $C_{25}$, $C_5$ to $C_{20}$, $C_5$ to $C_{15}$, $C_5$ to $C_{10}$, $C_{10}$ to $C_{30}$, $C_{10}$ to $C_{25}$, $C_{10}$ to $C_{20}$, and $C_{15}$ to $C_{25}$ alkenes, e.g., 1-decene, 1-undecene, 2-methyl-1-undecyl, 1-dodecene, 2-dodecene, 3-dodecene, 1-tridecene, 11-methyl-1-dodecene, 1-tetradecene, 1-pentadecene, 1-hexadecene, 1-heptadecene, 1-octadecene, 1-nonadecene, or eicosadecyl group, and PEG-terminated alkenes.

Embodiment 25

The method of Embodiment 22 or 23, where $R^{11}$ is H, particularly where at least one X is H, more particularly wherein each X is H.

Embodiment 26

The method of Embodiment 22 or 23, where photochemically reacting an alkene and a thioglycerol precursor includes photochemically reacting the alkene and a thioglycerol in the presence of an aliphatic liquid, particularly a paraffinic liquid.

Embodiment 27

The method of Embodiments 22 or 23, where photochemically reacting an alkene and a thioglycerol precursor includes providing radiation having a wavelength of about 365 nm.

As demonstrated above, embodiments of the invention provide new lubricant compositions that may be useful in a variety of lubricant operations, e.g., well-bore extension, well completion, etc. The new lubricant compositions may have one or more of the following advantages. For example, the compositions may have a lower coefficient of friction than currently known compositions, thereby facilitating well-bore lengths not before achievable. In some instances, the compositions may have better durability or persistence in the drilling environment. Some compositions described herein may allow a drilling operation to operate at a lower torque and/or overall friction factor. (Also referred to as total friction factor.) The total friction factor for a given drilling operation is a composite factor that combines the multiple factors specific to each well, drilling operation, and point in time for each well as it is evolving as the well bore changes. Total friction factor is described in "Friction Factor Model and Interpretation of Real Time Data (Thesis)," Christine Frafjord, Petroleum Geoscience and Engineering, Department of Petroleum Engineering and Applied Geophysics, Norwegian Univ. of Sci. and Tech., May 2013; "Improvement of Torque-and-Drag Modeling in Long-Reach Wells," Seyed Ahmad Mirhaj, Eirik Kaarstad, Bernt S. Aadnoy, Modern Applied Sci., Vol. 5, No. 5; October 2011, 10 ISSN 1913-1844 E-ISSN 1913-1852; "Real Time Torque and Drag Analysis during Directional Drilling (Thesis)," Mohammad Fazaelizadeh, Univ. of Calgary, Dept. of Chemical and Petroleum Engineering, Calgary, Alberta, Calif., March, 2013, each of which is incorporated by reference herein in its entirety. Operating Torque and Total Friction Factor are each a measure of the stress of the operation on the equipment. Reductions in one or more of these values may enable longer improvements in any property adversely affected by higher values, e.g., longer well-bores, longer operating times, between maintenance periods, higher efficiency, etc. Other characteristics and additional advantages are apparent to those skilled in the art.

It is believed that some friction-reduction composition surprisingly interact with metal, e.g., iron surfaces in the drilling environment. It had been thought that the reduction in boundary lubrication regime coefficient of friction is related to the amount of the friction-reducing composition that can adsorb on to iron surfaces (i.e., the μmols of friction-reduction composition that could be adsorbed per square meter of iron surface). Surprisingly, it has been found that greater reduction in the in boundary lubrication regime coefficient of friction may be achieved by selecting the friction-reducing composition based, not on the adsorption capacity, but rather upon the free energy of adsorption, $\Delta G°_{abs}$. When properly selected so that the friction reducing composition has a free-energy of adsorption (measured at ambient temperature and pressure) on iron≤about −18.0 kJ/mol, e.g., ≤about −20.0 kJ/mol, ≤about −22.0 kJ/mol, ≤about −24.0 kJ/mol, ≤about −26.0 kJ/mol, ≤about −28.0 kJ/mol, ≤about −30.0 kJ/mol, ≤about −35.0 kJ/mol show improved reduction in the boundary lubrication regime coefficient of friction. Particular compositions have a free energy of adsorption of about −18.0 to about −35.0 kJ/mol, about −20.0 to about −30.0 kJ/mol, about −22.0 to about −28.0 kJ/mol, about −24.0 to about −26.0 kJ/mol. In this way, less friction-reducing composition may need to be used than previously believed.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. For example, the compositions described herein may be free of any component, or composition not expressly recited or disclosed herein. Any method may lack any step not recited or disclosed herein. Likewise, the term "comprising" is considered synonymous with the term "including." And whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:

1. A lubricant composition suitable for use in drilling operations, comprising:
   a) about 90.0 to 99.0 wt % of at least one base oil composition, the base oil composition comprising about 1.0 to about 15.0 wt % water, and
   b) from about 1.0 to about 10.0 wt % of a friction-reducing composition comprising: at least one compound represented by Formula I:

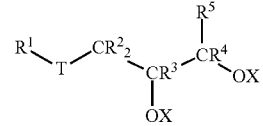

Formula I wherein each of IV, $R^2$, $R^3$, $R^4$ and $R^5$ is selected from the group consisting of H and branched or unbranched substituted or unsubstituted $C_1$ to $C_{50}$ hydrocarbyl groups;

T is selected from the group consisting of O and S groups; and

X is selected from H, branched or unbranched, substituted or unsubstituted $C_1$ to $C_{50}$ hydrocarbyl groups, acyl groups having a formula of R*C(O)— wherein R* may be a branched or unbranched, substituted or unsubstituted $C_1$ to $C_{50}$ hydrocarbyl group, an ester group having a formula of R'C(O)O—, where R' is a branched or unbranched, substituted or unsubstituted $C_1$ to $C_{50}$ hydrocarbyl group, Group 1-2 metal, $NR_4^+$ or $PR_4^+$ group, where each R group is independently selected from H and hydrocarbyl groups.

2. The composition of claim 1, wherein $R^1$ is selected from $C_{10}$ to $C_{30}$ hydrocarbyl groups.

3. The composition of claim 1, wherein $R^1$ is selected from n-dodecyl (lauryl), n-tetradecyl (myristyl), n-hexadecyl (palmityl), n-octadecyl (stearyl), n-9-octadecenyl (oleyl), and n-eicosenyl groups, and at least one X is H.

4. The composition of claim 1, wherein R1 is selected from n-dodecyl (lauryl), n-tetradecyl (myristyl), n-hexadecyl (palmityl), n-octadecyl (stearyl), n-9-octadecenyl (oleyl), and n-eicosenyl groups.

5. A method of making the lubricant composition of claim 1 comprising mixing the base oil composition and the friction-reducing composition and heating said composition to a temperature of from about 50° C. to about 80° C.

6. The lubricant composition of claim 1, wherein the base oil comprises a base oil, wherein the base oil is present in the lubricant composition in the range from about 50.0 to about 99.0 wt % and the friction-reducing composition is present in the lubricant composition in the amount of about 0.1 to about 6.0 wt %.

7. A method of making a lubricant composition suitable for use in drilling operations, comprising:
    a) providing at least one base oil composition, the base oil composition comprising about 1.0 to about 15.0 wt % water, and
    b) combining about 90.0 to about 99.0 wt % of the base oil composition with about 1.0 to about 10.0 wt % of a friction-reducing composition comprising: a compound represented by Formula I:

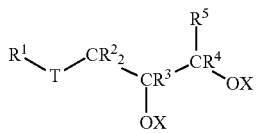

Formula I wherein each of $R^1$, $R^2$, $R^3$, $R^4$ and $R^5$ is selected from the group consisting of H and branched or unbranched, substituted or unsubstituted $C_1$ to $C_{50}$ hydrocarbyl groups;

T is selected from the group consisting of O and S groups; and

X is selected from H, branched or unbranched, substituted or unsubstituted $C_1$ to $C_{50}$ hydrocarbyl groups, acyl groups having a formula of R*C(O)— wherein R* is a branched or unbranched, substituted or unsubstituted $C_1$ to $C_{50}$ hydrocarbyl group, an ester group having a formula of R'C(O)O—, where R' is a branched or unbranched, substituted or unsubstituted $C_1$ to $C_{50}$ hydrocarbyl group, Group 1-2 metal, $NR_4^+$ or $PR_4^+$ group, where each R group is independently selected from H and hydrocarbyl groups.

8. The method of claim 7, wherein $R^1$ is selected from $C_{10}$ to $C_{30}$ hydrocarbyl groups.

9. The method of claim 7, wherein $R^1$ is selected from n-dodecyl (lauryl), n-tetradecyl (myristyl), n-hexadecyl (palmityl), n-octadecyl (stearyl), n-9-octadecenyl (oleyl), and n-eicosenyl groups, and at least one X is H.

10. The method of claim 7, wherein $R^1$ is selected from n-dodecyl (lauryl), n-tetradecyl (myristyl), n-hexadecyl (palmityl), n-octadecyl (stearyl), n-9-octadecenyl (oleyl), and n-eicosenyl groups.

11. The method of claim 7, wherein $R^1$ and at least one X are selected from n-dodecyl (lauryl), n-tetradecyl (myristyl), n-hexadecyl (palmityl), n-octadecyl (stearyl), n-9-octadecenyl (oleyl), and n-eicosenyl groups, wherein $R^1$ and the at least one X may be the same or different.

* * * * *